Patented Sept. 22, 1953

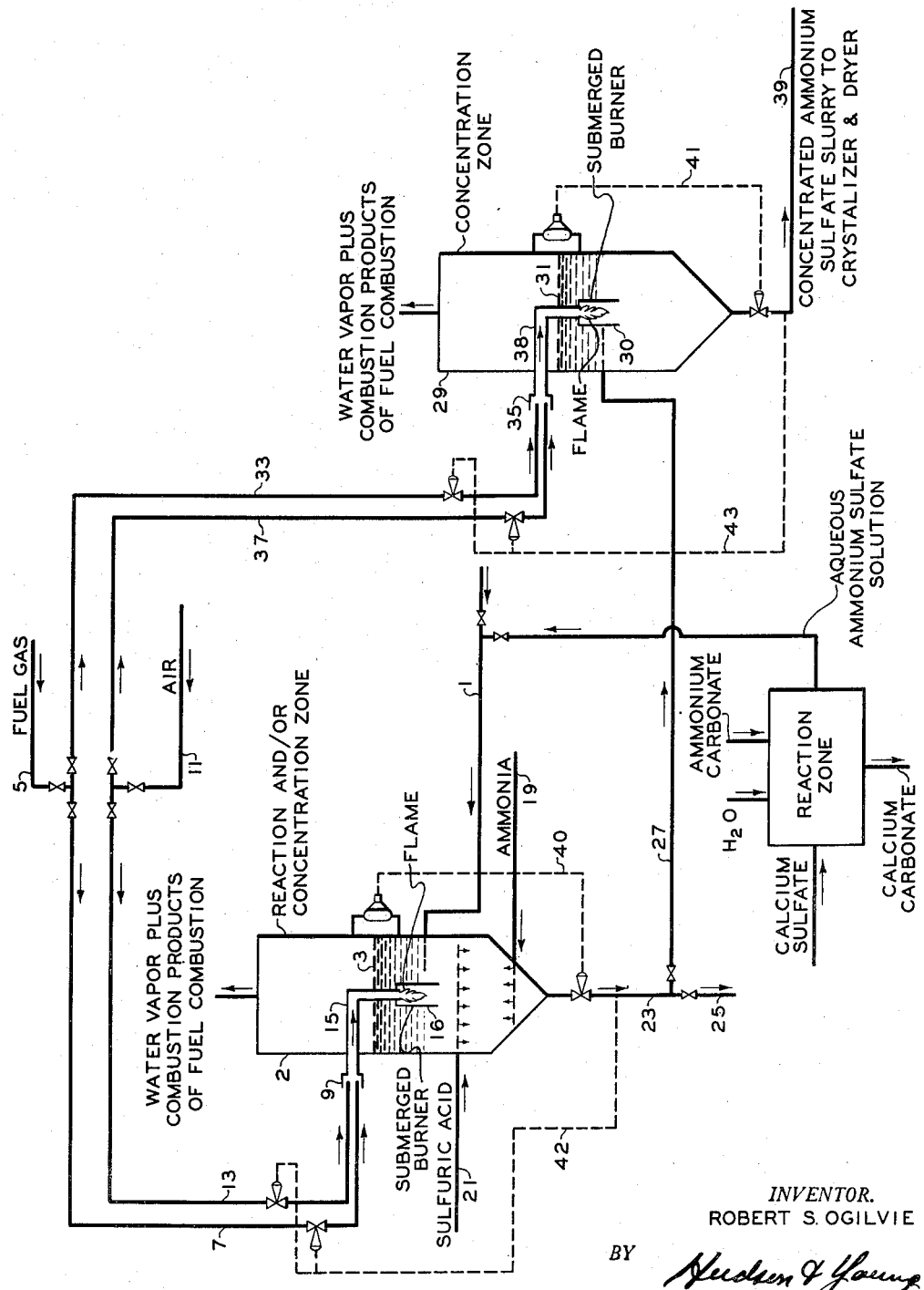

2,653,077

UNITED STATES PATENT OFFICE 2,653,077

PRODUCTION AND RECOVERY OF AMMONIUM SULFATE

Robert S. Ogilvie, Bartlesville, Okla., assignor to Phillips Petroleum Company, a corporation of Delaware Application May 9, 1949, Serial No. 92,198

3 Claims. (Cl. 23—119)

This invention relates to the production of ammonium sulfate. In one of its aspects it relates to the concentration of ammonium sulfate. In one of its more specific aspects it relates to the concentration of a dilute ammonium sulfate solution and to the production of ammonium sulfate by the reaction between sulfuric acid and ammonia.

Ammonium sulfate may be produced in known processes by the reaction of ammonium carbonate with calcium sulfate obtained from gypsum. Also, ammonium sulfate may be produced by the reaction of sulfuric acid and ammonia. In the production of ammonium sulfate by the gypsum process, that is, reaction between ammonium carbonate and calcium sulfate, a dilute solution of ammonium sulfate is formed. This solution usually contains from 10 to 30 per cent ammonium sulfate, which concentration is substantially below a saturated solution. In order to recover ammonium sulfate crystals such as are satisfactory to be used as a fertilizer, etc., the water solvent must be evaporated to give a saturated solution, or preferably a slurry of water and ammonium sulfate suitable to be processed in a crystallizer and ammonium sulfate crystal drier. A major cost item in producing ammonium sulfate is the expense involved in evaporating this water. When sulfuric acid and ammonia are reacted to produce ammonium sulfate considerable heat of reaction is given off. This heat of reaction may be advantageously used to evaporate water so as to concentrate an ammonium sulfate solution. Processes which offer economic and efficient methods of recovering ammonium sulfate crystals from dilute ammonium sulfate solution are great steps forward in the art.

I have invented a process for concentrating a dilute ammonium sulfate solution while at the same time producing ammonium sulfate by the reaction of sulfuric acid with ammonia. I believe that my process offers an optimum method of concentrating and producing ammonium sulfate, since my process recovers heat of reaction produced by the reaction of sulfuric acid with ammonium under optimum reaction and heat recovery conditions. The process of my invention comprises evaporating water from a dilute ammonium sulfate solution by directly contacting said dilute ammonium sulfate solution with hot products formed by the combustion of a mixture of fuel gas and an oxygen-containing gas in the same reaction zone wherein sulfuric acid is neutralized with gaseous ammonia. The direct contact of hot products of combustion and a dilute ammonium sulfate solution is preferably accomplished by the use of a submerged burner, enabling me to direct hot products of combustion down into the dilute ammonium sulfate solution. I find that submerged burner evaporation gives extremely high thermal efficiency and very good agitation to effect the reaction between sulfuric acid and ammonia as well as to effect evaporation of water through the recovery of the heat of reaction formed when sulfuric acid is neutralized with ammonia. The process of my invention is easy to control and the amount of equipment necessary to carry out the process of my invention is at a minimum because of the high thermal efficiency which I obtain. In a preferred embodiment of my invention, I react ammonium carbonate and calcium sulfate to produce a dilute aqueous solution of ammonium sulfate, and recover crystals of ammonium sulfate from this dilute solution by the procedure just discussed.

An object of this invention is to produce ammonium sulfate.

Another object of this invention is to concentrate a dilute ammonium sulfate solution so as to prepare a saturated solution or an ammonium sulfate-water slurry suitable for crystallizing, recovering and drying ammonium sulfate crystals.

Still another object of my invention is to provide a very economic, efficient and easy to control method of recovering ammonium sulfate from a dilute ammonium sulfate solution while at the same time recovering ammonium sulfate produced by the neutralization of sulfuric acid with ammonia.

Other objects and advantages of my invention will become apparent, to one skilled in the art, upon reading this disclosure.

The drawing, which accompanies and is a part of this disclosure, is a diagrammatic flow sheet setting forth a preferred specific embodiment of the process of my invention.

The following preferred specific embodiment of my invention is set forth to teach one skilled in the art how to practice the process of my invention. Reference is made to the drawing. A dilute aqueous ammonium sulfate solution is passed via line 1 to reaction and/or concentration zone 2 which contains a vapor zone above a liquid zone. Dotted line 3 indicates the interface between the vapor and liquid zone. The dilute ammonium sulfate solution passed into reaction zone 2 may contain from 1 weight per cent ammonium sulfate up to a pumpable slurry of ammonium sulfate and water, but is preferably and usually a dilute ammonium sulfate solution containing from 10 to 30 weight per cent ammonium sulfate produced by the so-called gypsum process, that is, by the reaction of ammonium carbonate with calcium sulfate. Ammonium sulfate solution may be introduced into reaction zone 2 at any suitable point, but since as hereinafter set forth ammonia gas is introduced into the lower portion of the liquid zone contained in reaction zone 2, I prefer to introduce the solution into the upper ⅔ portion of the liquid zone. Fuel gas is supplied via lines 5 and 7 to header 9. Air or an oxygen-containing gas is supplied via lines 11 and 13 to header 9. The fuel gas and air or the fuel gas and an oxygen-containing gas are mixed, and are passed via line 15 down into submerged burner 16 wherein the mixture is burned. The hot flue gases resulting from the burning directly contact the liquid giving up heat and evaporating water. Water vapor plus cooled combustion products are withdrawn overhead from reaction zone 2. Submerged burner 16 may, of course, be a nest of burners as well as a single burner.

Ammonia is passed into reaction zone 2 via line 19 and sulfuric acid is passed into reaction zone 2 via line 21. The sulfuric acid is preferably introduced at a point above the point of introduction of ammonia. Gaseous and/or liquid ammonia may be used, but it is preferred that gaseous ammonia be passed into reaction zone 2. While a gas stream containing ammonia and inert materials, such as coke oven gas, may be used as a source of ammonia to react with the sulfuric acid, I prefer to use ammonia of at least 90 weight per cent purity or, better still, substantially anhydrous ammonia. Introduction of inert gases, contained in the ammonia stream, which must be withdrawn overhead from reaction zone 2, should be kept at a minimum since their presence has been found to cause problems of spewing liquid out of the top of reaction zone 2. Also, water introduced must be evaporated since it will dilute the ammonium sulfate solution passed into reaction zone 2 and that ammonium sulfate formed by the reaction of ammonia and sulfuric acid. The presence of water and/or inert gases in the ammonia stream tends to lower the capacity of given equipment. The sulfuric acid introduced via line 21 may be dilute sulfuric acid but of course water present must be evaporated necessitating the use of more fuel gas and larger equipment for the production of a given quantity of ammonium sulfate. I prefer to use sulfuric acid of at least 90 weight per cent purity. I have found it preferable to introduce gaseous ammonia into the lower ⅓ portion of the liquid zone contained in reaction zone 2 and to introduce the sulfuric acid to the lower portion of the upper ⅔ portion of said liquid zone. Under these preferred conditions of introduction, good reaction between ammonia and sulfuric acid is obtained.

The process of my invention may be carried out completely in reaction and/or concentration zone 2, but as will hereinafter be set forth, I prefer to use a concentration zone following reaction zone 2. I prefer to use a subsequent concentration zone because of the plugging difficulties encountered with the ammonia vapor distributing device in the lower portion of the liquid zone contained in reaction zone 2. I find that it is desirable to operate reaction zone 2 so as to produce an ammonium sulfate solution which is no more than saturated. Ammonium sulfate crystals tend to plug up ammonia vapor distributing devices, necessitating shut-down time to unplug the equipment. If the process of my invention is carried out completely in reaction and/or concentration zone 2, the ammonium sulfate solution is preferably concentrated to a slurry suitable for further crystallization, recovery and drying of ammonium sulfate crystals. I prefer that this slurry contain 75-80 total weight per cent ammonium sulfate. This slurry is withdrawn from reaction zone 2 via lines 23 and 25 for further processing.

As hereinbefore set forth I prefer to use a concentration zone in conjunction with reaction zone 2. If such a concentration zone is used, a nearly saturated solution of ammonium sulfate and water is withdrawn from reaction zone 2 via line 23, and passed via lines 23 and 27 into concentration zone 29. The ammonium sulfate solution passed into concentration zone 29 should contain at least enough ammonium sulfate so that by water evaporation from concentration zone 29, the solution may be concentrated enough to prepare same for crystallization and recovery of ammonium sulfate crystals. I prefer that the solution withdrawn from reaction zone 2 and passed into concentration zone 29 contain from 30 to 50 weight per cent ammonium sulfate. Concentration zone 29 contains a vapor zone above a liquid zone. Dotted line 31 indicates the interface between the upper vapor zone and the lower liquid zone. Fuel gas is supplied via lines 5 and 33 to header 35, and air or an oxygen-containing gas is supplied via lines 11 and 37 to header 35. Fuel gas and oxygen-containing gas are mixed, and are passed via line 38 to submerged burner 30, one or more burners, wherein the mixture is burned. The resulting hot products of combustion directly contact the liquid contained in concentration zone 29. The heat content of the hot combustion products is used to evaporate water as in reaction or concentration zone 2. Water vapor in admixture with combustion products of fuel combustion are withdrawn overhead from concentration zone 29. An ammonium sulfate water slurry is withdrawn from concentration zone 29 via line 39 and is passed to suitable crystallizing, recovering and drying equipment. This withdrawn slurry preferably contains from 75-80 total weight per cent ammonium sulfate.

In carrying on the process of my invention any fuel gas, or available hot flue gases, may be used in the submerged burner, direct contact, step of my process. However, I prefer to use a fuel gas having a heating value of from 750–1250 B. t. u./ft.³ net, determined at 60° F. and 760 mm. of mercury. It is desirable to use as good a fuel gas as possible since high gas volume creates problems of liquid spewing over the top of reaction zone 2 and concentration zone 29. Also, I find it advisable to use no more than 25 per cent excess air or oxygen-containing gas for the reasons set forth above.

The process of my invention may be practiced with several reactors and/or concentrators operating in parallel, and if desired, more than two stages of concentration may be used.

The process of my invention may be controlled manually or automatically. However, I prefer to control the process of my invention by the use of automatic liquid level controllers 40 and 41 to maintain a constant liquid level in reaction and/or concentration zone 2 and concentration zone 29, respectively. Automatic fuel gas and air controllers 42 and 43 are used in conjunction with liquid level controllers 40 and 41 to control the amount of fuel gas and air or oxygen-containing gas passed to headers 9 and 35, respectively. These fuel gas and air controllers are set by the temperature of the ammonium sulfate solution or slurry withdrawn from reaction and/or concentration zone 2 and concentration zone 29. The total concentration of ammonium sulfate in the solution or slurry can be correlated with the temperature of the solution or slurry, the control valves regulating the fuel gas and air being set by this temperature. For instance, if while maintaining a constant liquid level in reaction zone 2 not enough evaporation is taking place, shown by the lowering of the temperature of the solution or slurry leaving reaction zone 2, the temperature controller would open the fuel gas and air valves, thus evaporating more water. In operating automatically using the liquid level controllers and the fuel gas and air controllers, the dilute ammonium sulfate solution feed rate is preferably maintained constant as is the feed rate of sulfuric acid and ammonia. Of course, the temperature control point may be in the reaction and/or concentration zone proper.

If desired, means may be used to add ammonia or sulfuric acid to the solution or slurry passed to concentration zone 29, if an excess of either is present due to excess ammonia or sulfuric acid being added to reaction zone 2 or due to incomplete neutralization in reaction zone 2. Of course, ammonia or sulphuric acid may be added to concentration zone 29 to serve the same purpose. The ammonia or sulfuric acid may conveniently be automatically added through the use of a control valve set by the pH of the solution or slurry.

Following is an example of the process of my invention. Reference is made to the drawing. The quantities, concentrations, temperatures, pressures, etc., set forth are not to be deemed to unduly limit the scope of my invention. A dilute ammonium sulfate water solution is passed via line 1 to reaction zone 2 at the rate of 101.7 tons per day. This solution contains 19.4 weight per cent ammonium sulfate and has a temperature of 199° F. Gaseous ammonia, under a pressure of 50 pounds per square inch gage and at a temperature of 150° F., is passed into reaction zone 2 via line 19 at a rate of 9.87 tons per day. This ammonia gas contains 99.7 weight per cent ammonia. Sulfuric acid is passed into reaction zone 2 via line 21 at a rate of 28.9 tons per day. This sulfuric acid is 98.0 weight per cent pure and has a temperature of 60° F. Ammonia gas passing up through the liquid zone reacts with sulfuric acid to produce ammonium sulfate.

Fuel gas, having a heating value of 875 B. t. u./ft.$^3$ net determined at 60° F. and 760 mm. of mercury, is passed via lines 5 and 7 into header 9 at a flow rate of 39,000 ft.$^3$ per day, calculated at 60° F. and 760 mm. of mercury. Air is passed via lines 11 and 13 into header 9 at a rate of 430,000 ft.$^3$ per day calculated at 60° F. and 760 mm. of mercury. Fuel gas and air are mixed and burned in submerged burner 16, and the hot products of combustion are passed into the liquid contained in reaction zone 2.

An ammonium sulfate solution, containing 47.8 weight per cent ammonium sulfate and at a temperature of 220° F., is withdrawn from reaction zone 2 via line 23 and is passed via lines 23 and 27 into concentration zone 29. Fuel gas having the same net heating value as that passed to header 9 is passed via lines 5 and 33 to header 35 at a rate of 99,000 ft.$^3$ per day, calculated at 60° F. and 760 mm. of mercury. Air at a rate of 1,090,000 ft.$^3$/day, calculated at 60° F. and 760 mm. of mercury, is passed via lines 11 and 37 into header 35. The air and fuel gas are mixed and burned in submerged burner 36, and the hot products of combustion are passed into the liquid contained in concentration zone 29. Water vapor evaporated and products of fuel combustion are withdrawn overhead from concentration zone 29.

An ammonium sulfate slurry containing 76.2 total weight per cent ammonium sulfate is withdrawn from concentration zone 29 via line 39. This withdrawn slurry has a temperature of 227° F.

The overall output of ammonium sulfate is 57.9 tons per day and the overall thermal efficiency of the process is 92 per cent.

As will be evident to those skilled in the art, various modifications of this invention can be made, or followed, in the light of the foregoing disclosure and discussion, without departing from the spirit or scope of the disclosure or from the scope of the claims.

I claim:

1. A process for the production and concentration of ammonium sulfate which comprises, passing a water solution of ammonium sulfate containing from 10 to 30 weight per cent ammonium sulfate into the upper ⅔ portion of a liquid zone contained in a reaction zone, said reaction zone containing a vapor zone above said liquid zone, burning within said liquid zone a combustible mixture of fuel gas, having a heating value of from 750 to 1250 B.t.u./ft.$^3$ net at 60° F. and 760 mm. of mercury, and air, said air being present in said mixture in an amount not exceeding 25 volume per cent more than that required to completely combust said fuel gas, directly contacting said water solution of ammonium sulfate and resulting hot products of said burning in said liquid zone so as to evaporate water from said solution, withdrawing water vapor from said vapor zone, introducing gaseous ammonia having a purity of at least 90 weight per cent into the lower ⅓ portion of said liquid zone, introducing sulfuric acid having a purity of at least 90 weight per cent into the lower portion of the upper ⅔ portion of said liquid zone, reacting ammonia with sulfuric acid in said liquid zone to produce ammonium sulfate, withdrawing a water solution of ammonium sulfate from the lower portion of said liquid zone containing from 30 to 50 weight per cent ammonium sulfate, such water solution containing no crystallized ammonium sulfate, introducing said withdrawn ammonium sulfate solution into the upper ⅔ portion of a liquid zone contained in a concentration zone, said concentration zone containing a vapor zone above said liquid zone, burning within said liquid zone a second combustible mixture of fuel gas, having a heating value of from 750 to 1250 B.t.u./ft.$^3$ net at 60° F. and 760 mm. of mercury, and air, directly contacting said last-mentioned ammonium sulfate solution and resulting hot products of said last-mentioned burning in the last said liquid zone so as to evaporate water, withdrawing water vapor from the upper portion of the last said vapor zone, and withdrawing an ammonium sulfate-water slurry from the bottom portion of the last said liquid zone containing from 75–80 weight per cent total ammonium sulfate.

2. A process for the production and concentration of ammonium sulfate which comprises, passing a water solution of ammonium sulfate containing from 10 to 30 weight per cent ammonium sulfate into the upper ⅔ portion of a liquid zone contained in a reaction zone, said reaction zone containing a vapor zone above said liquid zone, burning within said liquid zone a combustible mixture of fuel gas, having a heating value of from 750 to 1250 B.t.u./ft.³ net at 60° F. and 760 mm. of mercury, and air, said air being present in said mixture in an amount not exceeding 25 volume per cent more than that required to completely combust said fuel gas, directly contacting said water solution of ammonium sulfate and resulting hot products of said burning in said liquid zone so as to evaporate water from said solution, withdrawing water vapor from said vapor zone, introducing gaseous ammonia having a purity of at least 90 weight per cent into the lower ⅓ portion of said liquid zone, introducing sulfuric acid having a purity of at least 90 weight per cent into the lower portion of the upper ⅔ portion of said liquid zone, reacting said ammonia with said sulfuric acid in said liquid zone to produce ammonium sulfate, and withdrawing an ammonium sulfate-water slurry from the bottom portion of said liquid zone containing from 75–80 weight per cent total ammonium sulfate.

3. A process for the production and concentration of ammonium sulfate which comprises, passing a water solution of ammonium sulfate containing from 10 to 30 weight per cent ammonium sulfate into the upper ⅔ portion of a liquid zone contained in a reaction zone, said reaction zone containing a vapor zone above said liquid zone, burning within said liquid zone a combustible mixture of fuel gas and air, directly contacting said water solution of ammonium sulfate and resulting hot products of said burning in said liquid zone so as to evaporate water from said solution, withdrawing water vapor from said vapor zone, introducing gaseous ammonia having a purity of at least 90 weight per cent into the lower ⅓ portion of said liquid zone, introducing sulfuric acid having a purity of at least 90 weight per cent into the lower portion of the upper ⅔ portion of said liquid zone, reacting said ammonia with said sulfuric acid in said liquid zone to produce ammonium sulfate, and withdrawing an ammonium sulfate-water slurry from the bottom portion of said liquid zone containing from 75–80 weight per cent total ammonium sulfate.

ROBERT S. OGILVIE.

References Cited in the file of this patent

UNITED STATES PATENTS

| Number | Name | Date |
|---|---|---|
| 1,730,440 | Smith | Oct. 8, 1929 |
| 1,988,701 | Pyzel | Jan. 22, 1935 |
| 2,086,902 | Doennecke | July 13, 1939 |
| 2,331,235 | Ruys et al. | Oct. 5, 1943 |
| 2,424,205 | Otto | July 15, 1947 |

FOREIGN PATENTS

| Number | Country | Date |
|---|---|---|
| 434,622 | Great Britain | Sept. 5, 1935 |

OTHER REFERENCES

Mellor, "Treatise on Inorganic and Theoretical Chemistry," 1922, vol. 2, pages 694 and 695.